(12) United States Patent
Wilson

(10) Patent No.: US 7,558,594 B2
(45) Date of Patent: Jul. 7, 2009

(54) FLEXIBLE COVER FOR A MOBILE TELEPHONE

(75) Inventor: Simon Wilson, Berkshire (GB)

(73) Assignee: Nokia Corporation, Espoo (FI)

( * ) Notice: Subject to any disclaimer, the term of this patent is extended or adjusted under 35 U.S.C. 154(b) by 178 days.

(21) Appl. No.: 10/521,663

(22) PCT Filed: Apr. 22, 2003

(86) PCT No.: PCT/IB03/01880

§ 371 (c)(1),
(2), (4) Date: Sep. 22, 2005

(87) PCT Pub. No.: WO2004/008725

PCT Pub. Date: Jan. 22, 2004

(65) Prior Publication Data

US 2006/0128417 A1    Jun. 15, 2006

(30) Foreign Application Priority Data

Jul. 16, 2002    (GB) ................................. 0216474

(51) Int. Cl.
*H04M 1/00* (2006.01)

(52) U.S. Cl. ................. 455/550.1; 455/90.1; 455/575.8

(58) Field of Classification Search .............. 455/550.1, 455/575.1, 90.1
See application file for complete search history.

(56) References Cited

U.S. PATENT DOCUMENTS

| | | | | |
|---|---|---|---|---|
| 4,334,367 A | * | 6/1982 | Salomon | 36/117.2 |
| 5,111,503 A | * | 5/1992 | Takagi | 379/433.13 |
| 5,521,794 A | | 5/1996 | Hargrave et al. | |
| 6,082,535 A | * | 7/2000 | Mitchel | 206/320 |
| 6,382,448 B1 | | 5/2002 | Yuhara et al. | |
| 6,453,155 B1 | * | 9/2002 | Hill et al. | 455/90.1 |
| 6,729,518 B2 | * | 5/2004 | Badillo et al. | 224/578 |
| 2001/0022840 A1 | | 9/2001 | Kwak | |
| 2002/0027768 A1 | * | 3/2002 | Tseng et al. | 361/683 |
| 2002/0065054 A1 | | 5/2002 | Humphreys et al. | |
| 2002/0193136 A1 | * | 12/2002 | Halkosaari et al. | 455/550 |
| 2003/0083094 A1 | * | 5/2003 | Hsu et al. | 455/550 |

FOREIGN PATENT DOCUMENTS

| | | |
|---|---|---|
| DE | 19961707 | 3/2001 |
| EP | 0531531 A1 | 3/1993 |
| EP | 1024644 A2 | 2/2000 |
| JP | 090186752 | 7/1997 |
| JP | 2000-141466 | 5/2000 |
| WO | WO 0203828 | 1/2002 |
| WO | WO 02/45389 A2 | 6/2002 |

* cited by examiner

*Primary Examiner*—Rafael Pérez-Gutiérrez
*Assistant Examiner*—Amancio Gonzalez
(74) *Attorney, Agent, or Firm*—Ware, Fressola, Van Der Sluys & Adolphson LLP

(57) ABSTRACT

A mobile telephone comprising: an engine assembly comprising a display and a plurality of switches; and a flexible cover overlying, without an intermediate rigid cover, and snugly fitting the engine assembly and comprising an aperture aligned with the display and an integrated keypad, for user input, aligned with the plurality of switches.

16 Claims, 5 Drawing Sheets

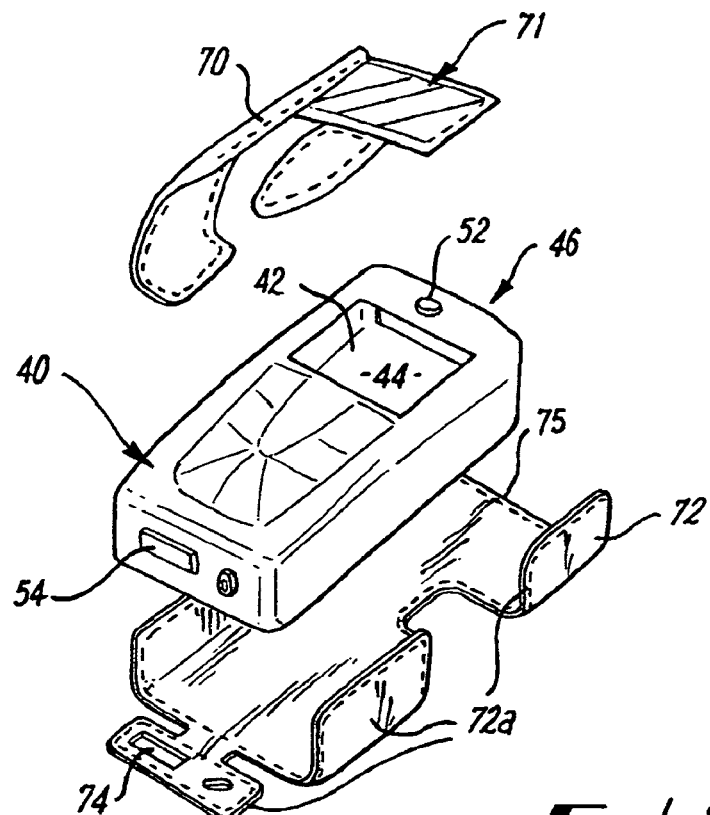
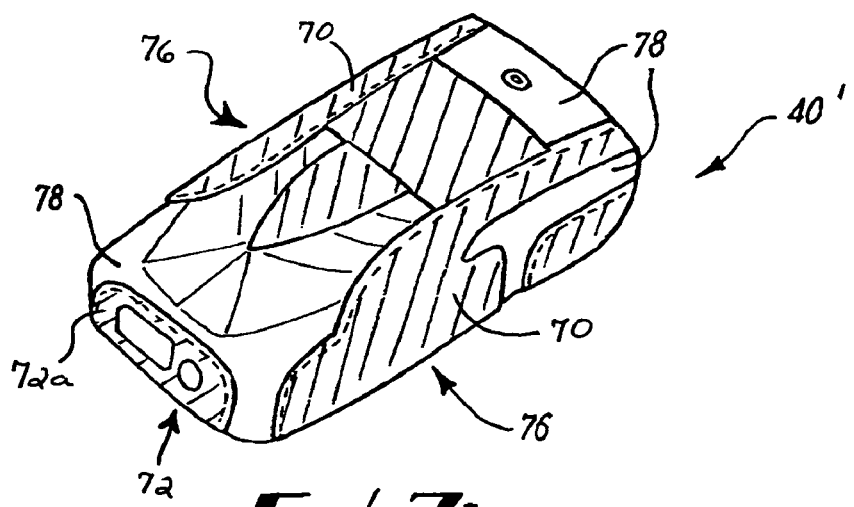

FLEXIBLE COVER FOR A MOBILE TELEPHONE

CROSS REFERENCE TO RELATED APPLICATIONS

This application is for entry into the U.S. national phase under §371 for International Application No. PCT/IB03/01880 having an international filing date of Apr. 22, 2003, and from which priority is claimed under all applicable sections of Title 35 of the United States Code including, but not limited to, Sections 120, 363 and 365(c), and which in turn claims priority under 35 U.S.C. §119(e) to European Patent Application No. GB 0216474.7 filed on Jul. 16, 2002.

TECHNICAL FIELD

The present invention relates to a cover for a hand-portable appliance and the hand-portable appliance with the cover. It particularly relates to a cover for a mobile phone and a mobile phone with cover.

BACKGROUND OF THE INVENTION

There has been a trend in the mobile phone industry towards giving users the ability to alter the appearance of their phone. One way of adapting the phone's external appearance is to fit a leather sack-like cover over the exterior of the phone. These external covers protect the exterior plastic cover from damage and allow some adaptation of the phone's appearance, however, they significantly increase the bulk and weight of the phone. Another way of adapting the phone's external appearance is to provide user replaceable rigid plastic covers as described in U.S. Pat. No. 6,347,218. The replaceable covers have proven to be very popular and the phone is now becoming a fashion accessory which is worn and/or displayed by a user.

FIG. 1a shows an example of a prior art phone 2 comprising an engine assembly 10 enclosed by a removable rigid plastic front cover 4 and a removable rigid plastic back cover 8. A loose keypad 6 overlies switches 14 (key domes) of the engine assembly 10 and is held is place by the rigid plastic front cover 4 in the assembled phone 2. The components of the prior art phone 2, and the engine assembly in particular, are schematically illustrated in FIG. 2. The engine assembly 10 is in physical connection with the keypad 6 as shown by arrow A. The engine assembly 10 comprises a plurality of keyboard switches 14 electrically connected to a processor 20, a battery 30 electrically connected to at least the processor 20 for power distribution to other circuitry, a SIM card 28 electrically connected to the processor 20, a display 12 electrically connected to the processor 20, a memory 26 electrically connected to the processor 20, radio transceiver circuitry 24 for communicating in a cellular communications network is electrically connected to the processor 20 and an audio part 22 is electrically connected to the processor 20. The audio part 22 provides an electrical signal to the speaker 16 and receives an electrical signal from the microphone 18. The inter-operation of these parts to operate as a cellular mobile phone is well known to persons skilled in the art, who will additionally appreciate that although a GSM compliant engine assembly 10, as in this example, has a SIM card 28 it may not be present in engine assemblies for other cellular communication standards.

FIG. 1b shows an alternative design of covers for the phone 2. In this example, the rigid plastic back cover 8 is permanently attached to the engine assembly 10 and is not removable. The rigid plastic front cover 4 is removable and a loose keypad 6 is located between it and the engine assembly 10 when the phone 2 is assembled.

The rigid plastic covers 4 and 8 are three-dimensional and provide a recognisable shape to the phone. They additionally may protect the engine assembly 10 against damage and water ingress and are easily made by injection moulding. For these reasons rigid covers, and plastic covers in particular, are universally used to enclose the engine assembly 10.

The inventor has realised that it would be desirable to have a greater range of fashionable phones. In particular, the inventor has realised that it would be desirable to allow a user greater choice in adapting the appearance of their phones.

SUMMARY OF THE INVENTION

According to one aspect of the present invention there is provided a mobile phone comprising: an engine assembly comprising a display and a plurality of switches; and a flexible cover overlying, without an intermediate rigid cover, and snugly fitting the engine assembly comprising an aperture aligned with the display and an integrated keypad, for user input, aligned with the plurality of switches.

The flexible cover may be three dimensional and used to define the appearance and/or shape of a phone. Embodiments of the invention therefore provide for a greater range of fashionable phones without compromising the size or weight of the phone. Embodiments of the invention overcome the existing prejudice in the technical field in favour of using rigid plastic covers. The absence of a rigid plastic cover, provides the user with better tactility as the flexible cover may be deformable in response to a user's touch.

The flexible cover may be made from fabric, leather, elastomeric material or any other flexible material which is sufficiently durable and attractive to a user. The engine assembly and flexible cover may have corresponding projections and receptacles so that in the assembled mobile phone, the flexible cover is correctly aligned on the engine assembly. The flexible cover may have a substrate on its interior surface to improve its waterproof and/or shock-absorbing properties. This material may be elastomeric.

The inventor has additionally recognised similarities between the training/running shoe industry and the mobile phone industry. Trainers were initially bought by serious athletes, but they are now an established fashion accessory and their fashionable appearance is important. Likewise, the inventor has realised that mobile phones were initially bought by businessmen, but that they are now starting to become fashion accessories. The inventor has recognised that this trend will continue for mobile phones. According to one embodiment of the present invention, the flexible cover is made in accordance with the same techniques used in the training/running shoe industry. Thus the flexible cover may appear similar to a training/running shoe.

BRIEF DESCRIPTION OF THE DRAWINGS

For a better understanding of the present invention, reference will now be made by way of example only to the accompanying drawings in which:

FIGS. 7a and 7b illustrate the construction of a flexible cover in a manner similar to a sports shoe.

DETAILED DESCRIPTION

Figure 3:
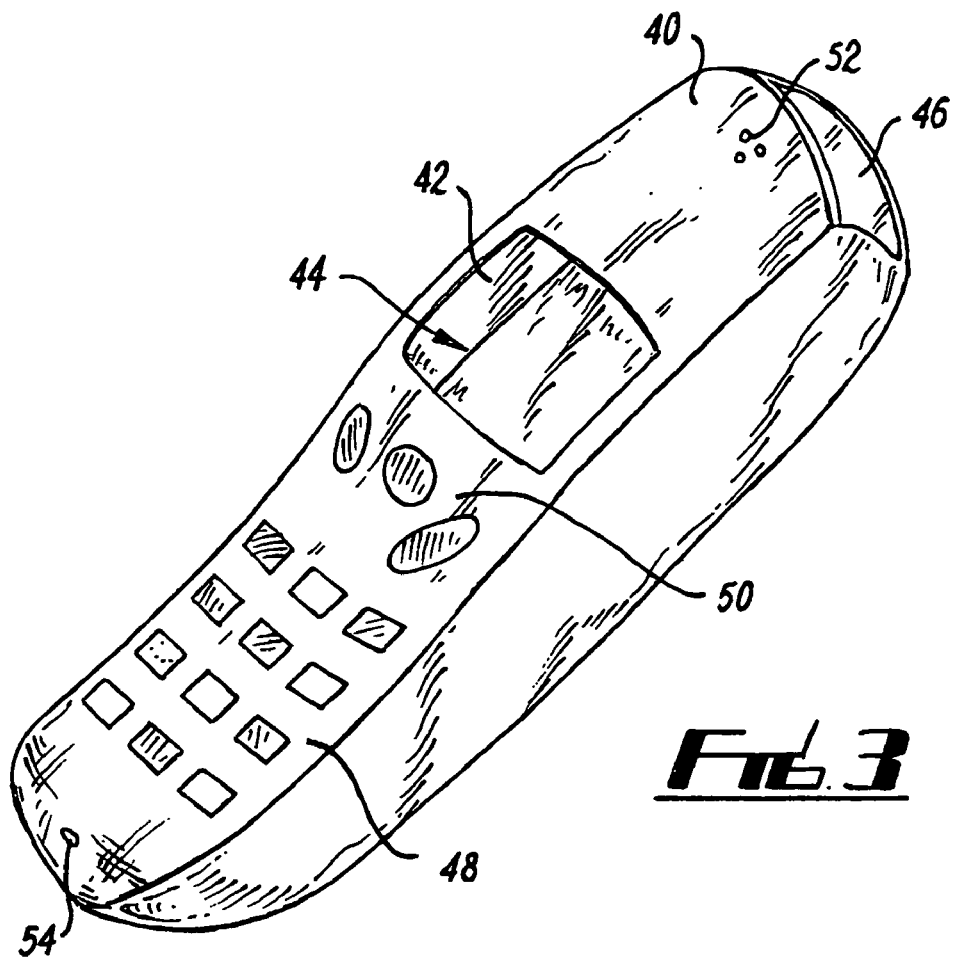
FIG. 3 illustrates an embodiment of a flexible cover.

FIG. 3 illustrates a flexible cover 40 which is sized to fit snugly over an engine assembly 10 for a mobile phone. The engine assembly 10 comprises substantially all of the phone's circuitry. The flexible cover 40 is formed from flexible material that is shaped to define an internal cavity 44.

Figure 5:
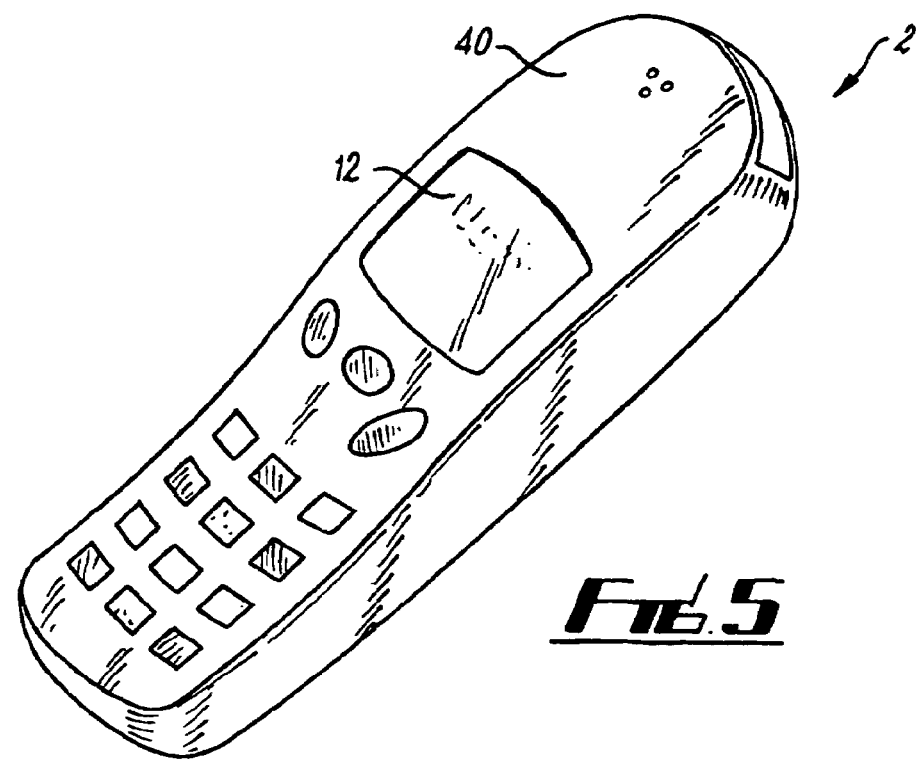
FIG. 5 illustrates a mobile phone comprising an engine assembly and a flexible cover.
Figure 6:
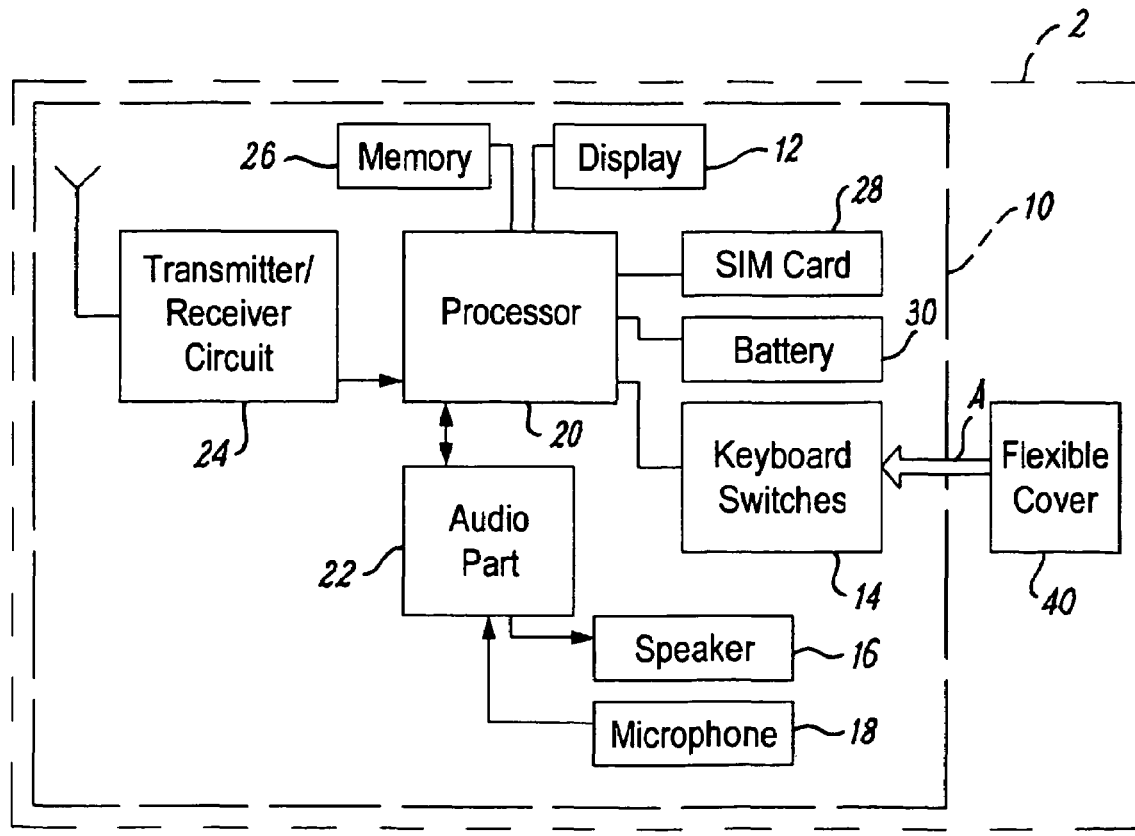
FIG. 6 is a schematic illustration of a mobile phone comprising an engine assembly and a flexible cover.

An insertion aperture 46 through the material of the flexible cover 40 provides access to the internal cavity 44. The insertion aperture 46 is used to insert an engine assembly into the internal cavity 44. The flexible cover 40 has a display aperture 42 through the material of the flexible cover 40. When the engine assembly is fully inserted into the cavity 44 of the flexible cover 40, the display 12 of the engine assembly 10 is visible through the display aperture 42 as shown in FIG. 5. The flexible cover 40 has one or more speaker apertures 52 through the material of the cover to the internal cavity 44. When the engine assembly 10 is fully inserted into the cavity 44 of the flexible cover 40, the speaker aperture(s) 52 are aligned with the speaker 16 of the engine assembly 10, as shown in FIG. 5. The flexible cover 40 has a microphone aperture 54 through the material of the flexible cover 40 to the cavity 44. When the engine assembly 10 is fully inserted into the cavity 44 of the flexible cover 40, the microphone aperture 54 of the flexible cover 40 is aligned with the microphone 18 of the engine assembly 10.

The flexible cover 40 has a plurality of key portions on which indicia are carried. The plurality of key portions forms a keypad which is integrated into the material of the flexible cover 40. The keypad includes a three column by 4 row array 48 of separate key portions which correspond to the normal 3 by 4 array of keys on a mobile phone for data entry. The keypad also includes a plurality of key portions 50 located between the array 48 of key portions and the display aperture 42. These key portions correspond to the functional keys and/or soft keys commonly found in mobile phones. Each one of the key portions of the keypad is associated with at least one of the key board switches 14 of the engine assembly 10. Thus, when the engine assembly 10 is fully inserted into the cavity 44 of the flexible cover 40, each one of the key portions of the flexible cover 40 directly overlies at least one keyboard switch 14 of the engine assembly 10. Thus, if a user depresses a key portion of the flexible cover 40 it actuates a keyboard switch 14 of the engine assembly 10.

The flexible cover 40 is sized and dimensioned so that it fits very closely and snugly to the engine assembly 10 and forms a decorative enclosure for the engine assembly 10. The flexible cover 40 is therefore analogous to a "skin". The flexible cover 40 preferably has direct contact with the engine assembly 10. A plastic cover does not intercede between the fabric cover 40 and the engine assembly 10.

The flexible cover 40 may be made from a mouldable elastomer, from fabric or from embossed leather. The flexible cover 40 may have stitching, zips, poppers or velcro. Preferably, the flexible cover 40 is designed so that the insertion aperture 46 may be closed after the engine assembly 10 has been fully inserted into the cavity 44. The closure of the insertion aperture 46 may be provided by tie up laces (as in a shoe), a zip, poppers or velcro.

The flexible cover 40 may be formed from one piece of fabric or leather. Alternatively it may be constructed in a similar fashion to a sports shoe for example with polyurethane printing of logos and indicia onto the surface of the flexible cover 40. FIGS. 7a and 7b illustrate in more detail the construction of a flexible cover in a manner similar to a sports shoe.

Referring to FIG. 7a, the flexible cover 40 described in relation to FIG. 3, has layered fabric (or leather) portions 70 and 72 attached to it to form the sports shoe type cover 40' (see FIG. 3). The flexible cover 40 acts as a substrate for the fabric (or leather) portions. A rear fabric (or leather) portion 72 is attached to the rear of the flexible cover 40. In this embodiment it has limbs 72a which extend around the sides of the flexible cover 40. One of these limbs 72a extends over the microphone aperture 54 of the flexible cover 40. It has an aperture 74 which is aligned with the microphone aperture 54 when the rear fabric (or leather) portion 72 is attached to the flexible cover 40. As seen in FIG. 7b, two side fabric (or leather) portions 70 are attached to the sides of the flexible cover 40. These side portions 70 may overlap the rear portion 72 as shown generally by reference numeral 76 in FIG. 7b. In this example, one of the side portions 70 has a display window 71 attached to it which is positioned over the display aperture 42 in the flexible cover 40. The portions 70, 72 may have designs and/or stitching 75 applied to them, before they are attached to the flexible cover 40 to change their aesthetic appearance. The fabric or leather portions 70, 72 may be attached to the elastomeric flexible cover 40 by stitching or adhesive. The assembled shoe-like flexible cover 40' is illustrated in FIG. 7b. The portions 70, 72 that have been added to the flexible elastomeric cover 40 including the side portions 70 and rear portion 72 and display 71 are indicated using hatching in the figure. In this example, portions 78 of the underlying flexible cover 40 are exposed in gaps between the attached fabric portions 70, 72.

Figure 1A:
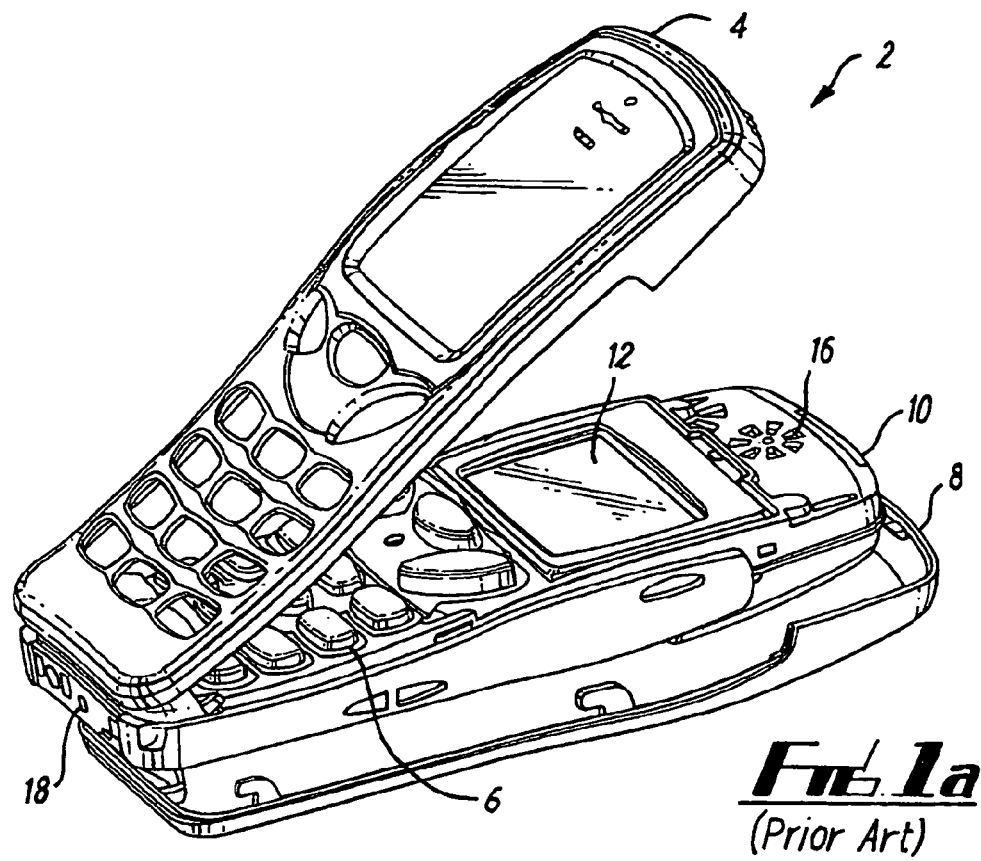
FIGS. 1a and 1b illustrate prior art user replaceable plastic covers for a mobile phone.
Figure 1B:
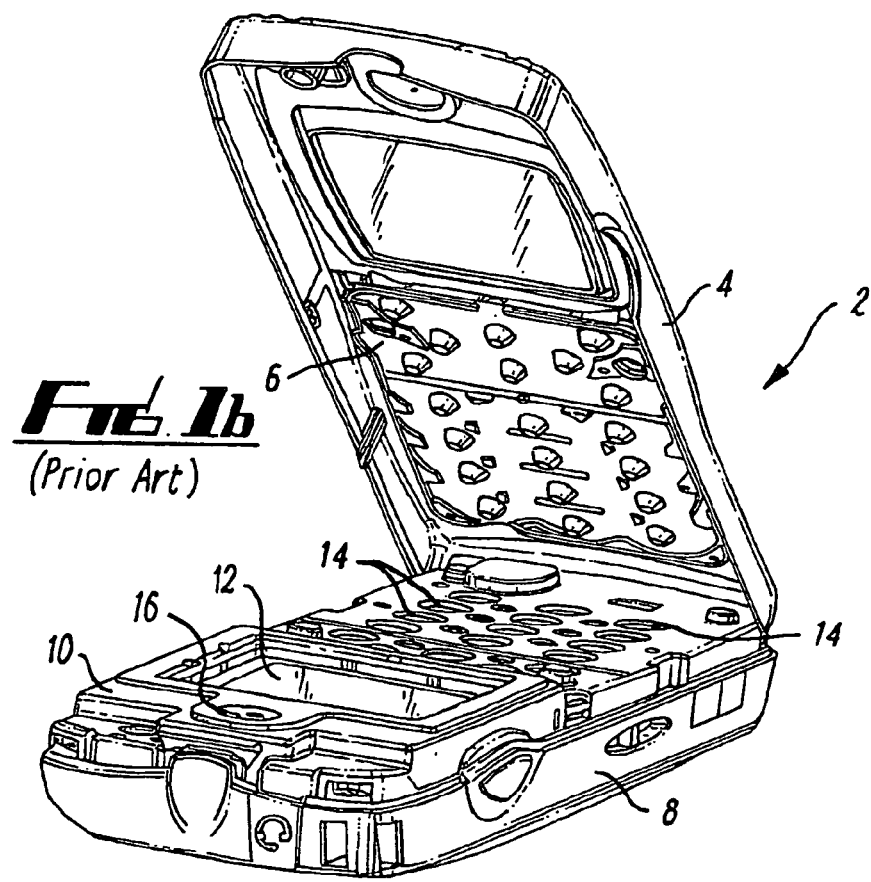
Figure 2:
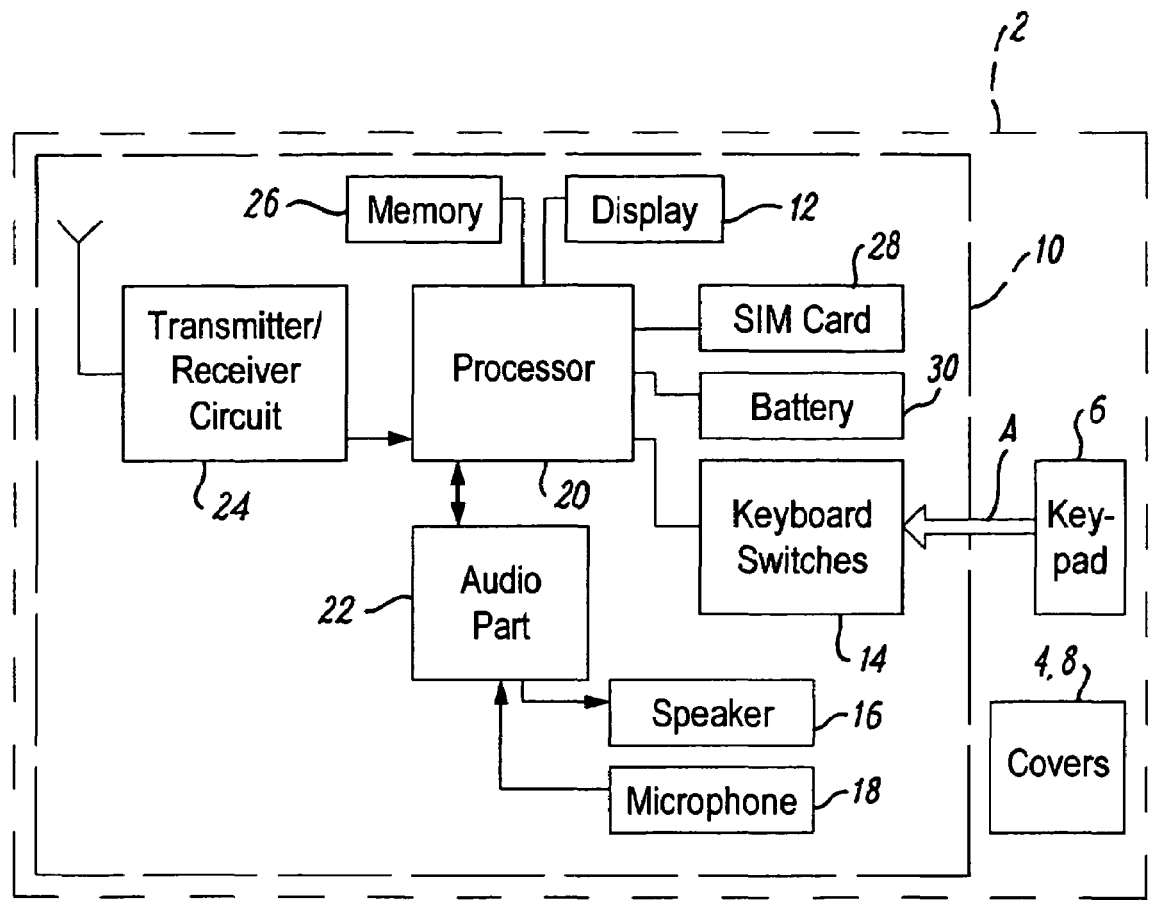
FIG. 2 is a schematic illustration of a prior art phone.
Figure 4:
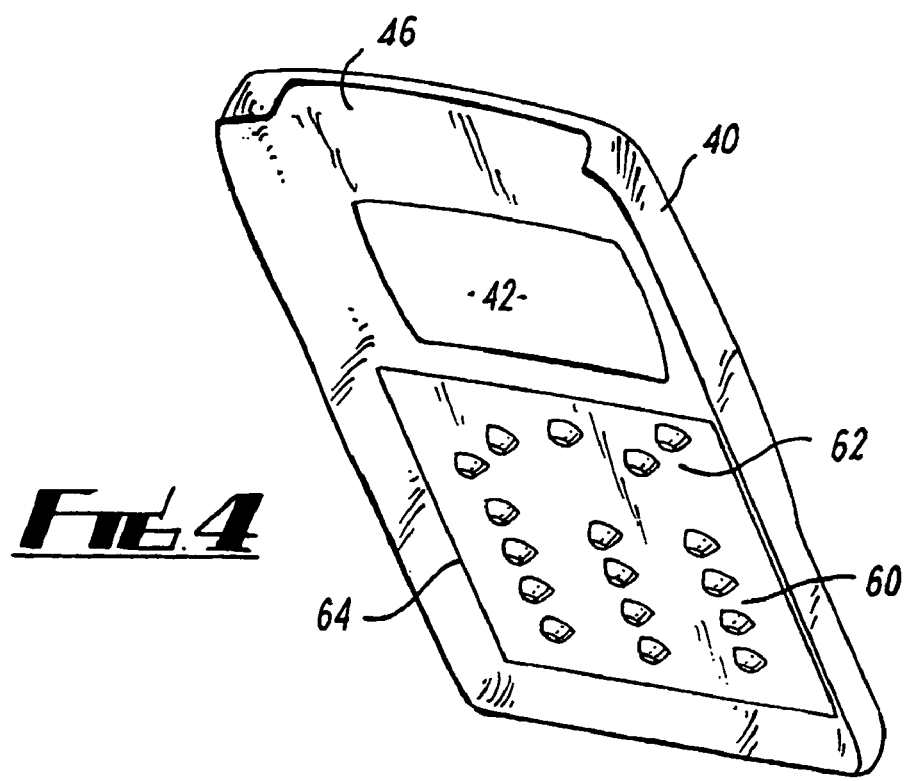
FIG. 4 illustrates a cut away portion of the flexible cover of FIG. 3.

FIG. 4 illustrates a cut away portion of one embodiment of the flexible cover 40 illustrated in FIG. 3. The relationship of FIG. 4 to FIG. 3 can be understood by imagining slicing the flexible cover 40 in half lengthways (across its depth) and turning over the uppermost portion of the flexible cover 40. Thus, FIG. 4 illustrates the interior of the cavity 44 of the flexible cover 40. An elastomeric sheet 64 is permanently attached to the interior of the flexible cover 40 in the region corresponding to the key portions. The elastomeric sheet 64 is a moulded substrate and has a plurality of elastomeric projections 62. There is at least one projection 62 associated with each key portion. The engine assembly 10 has a corresponding plurality of receptacles in its upper surface (illustrated in FIG. 1b). When the engine assembly 10 is fully inserted into the flexible cover 40 each one of the elastomer projections 62 is received in one of the corresponding receptacles of the engine assembly 10. Each receptacle in the engine assembly 10 is located at a keyboard switch 14. Thus, when the engine assembly 10 is fully inserted into the flexible cover 40 the elastomer projections are received in the receptacles and aligned with the keyboard switches 14. This ensures, in the assembled phone 2, that when a key portion is pressed it actuates a keyboard switch. 14. The reception of the projections 62 in the receptacles also aligns the display aperture 42 with the display 12, the speaker apertures 52 with the speaker 16 and the microphone aperture 54 with the microphone 18.

According to another embodiment of the invention, the elastomeric sheet 64 may extend over the entire interior of the flexible cover 40. This provides an additional shock absorbing layer to the exterior material of the flexible cover 40 and also provides additional waterproofing. In some embodiments, the elastomeric sheet 64 may extend over the display aperture 42 to increase the waterproofing.

The flexible cover 40 may be replaced by a user. For example one flexible cover 40 may be interchanged with another flexible cover to change the appearance of the phone.

Although the present invention has been described in the preceding paragraphs with reference to particular examples, it should be appreciated that various modifications and variations may be made thereto without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mobile telephone comprising:
an engine assembly comprising a display and a plurality of switches; and a substantially fabric, leather or elastically deformable material flexible cover overlying, without an intermediate rigid cover, and snugly fitting the engine assembly and comprising an integrated keypad, for user input, aligned with the plurality of switches, and
wherein the flexible cover defines a cavity for receiving the engine assembly and has an insertion aperture through the material of the flexible cover to the cavity through which the engine assembly can fit.

2. A mobile telephone as claimed in claim 1, further comprising means for closing or restricting the insertion aperture after the engine assembly has been inserted.

3. A mobile telephone as claimed in claim 1, wherein the flexible cover comprises an aperture aligned with the display.

4. A mobile telephone as claimed in claim 1, comprising a plurality of fabric or leather portions attached to the substantially elastically deformable material flexible cover and/or each other.

5. A mobile telephone as claimed in claim 4, wherein portions of the plurality of leather or fabric portions overlap.

6. A mobile telephone as claimed in claim 5, wherein portions of the substantially elastically deformable material flexible cover are exposed.

7. A mobile telephone as claimed in claim 4, wherein the flexible cover has sides and wherein the at least one leather or fabric portion of the flexible cover comprises a rear portion with limbs that extend around the sides of the flexible cover and side portions attached to the sides of the flexible cover.

8. A mobile telephone as claimed in claim 1, wherein the integrated keypad has a plurality of key portions on an exterior surface of the flexible cover and a plurality of corresponding projections on the interior surface of the flexible cover, each of said projections being arranged to actuate one of the plurality of switches of the engine assembly.

9. A mobile telephone as claimed in claim 1, wherein the flexible cover and the engine assembly have corresponding projections and receptacles for aligning the flexible cover correctly with the engine assembly.

10. A mobile telephone as claimed in claim 1, wherein the flexible cover is substantially formed from one-piece of material.

11. A mobile telephone as claimed in claim 1, wherein the flexible cover has an elastic and waterproof substrate adjacent the engine assembly.

12. A mobile telephone as claimed in claim 1, wherein the flexible cover has a molded elastomer substrate adjacent the engine assembly.

13. A mobile telephone as claimed in claim 1, wherein the flexible cover is user replaceable.

14. The mobile telephone of claim 1, without a non-rigid intermediate cover.

15. A user replaceable flexible cover for a mobile phone having an engine assembly comprising a display and a plurality of switches, wherein the user replaceable flexible cover comprises: a substantially fabric, leather or elastically deformable material flexible cover overlying, without an intermediate rigid cover, and snugly fitting the engine assembly; an integrated keypad, for user input, aligned with the plurality of switches and wherein the flexible cover defines a cavity for receiving the engine assembly and has an insertion aperture through the material of the flexible cover to the cavity through which the engine assembly can fit.

16. A mobile telephone comprising:
an engine assembly comprising a display and a plurality of switches and a leather/fabric cover overlying, without an intermediate rigid cover, and snugly fitting the engine assembly and comprising an integrated keypad, for user input, aligned with the plurality of switches, wherein the flexible cover comprises a flexible substrate and at least one leather fabric portion attached to the substrate and wherein the flexible cover defines a cavity for receiving the engine assembly and has an insertion aperture through the material of the flexible cover to the cavity through which the engine assembly can fit.

* * * * *